United States Patent [19]

Masaki et al.

[11] Patent Number: 5,532,571
[45] Date of Patent: Jul. 2, 1996

[54] CONTROL APPARATUS FOR INDUCTION MOTOR

[75] Inventors: Ryoso Masaki, Hitachi; Nobuyoshi Mutoh, Hitachinaka, both of Japan

[73] Assignee: Hitachi, Ltd., Japan

[21] Appl. No.: 426,913

[22] Filed: Apr. 21, 1995

[30] Foreign Application Priority Data

Apr. 21, 1994 [JP] Japan ................................. 6-082840

[51] Int. Cl.$^6$ ........................................................ H02P 5/40
[52] U.S. Cl. ............................ 318/809; 318/799; 318/806
[58] Field of Search ...................................... 318/798, 805, 318/806, 808, 803, 810, 809, 799

[56] References Cited

U.S. PATENT DOCUMENTS

| | | | |
|---|---|---|---|
| 4,673,858 | 6/1987 | Saito | 318/805 |
| 4,780,650 | 10/1988 | Miyazaki et al. | 318/798 |
| 4,823,066 | 4/1989 | Yoshiki et al. | 318/806 |
| 5,003,243 | 3/1991 | Tadakuma et al. | 318/808 |
| 5,387,855 | 2/1995 | Miyazaki et al. | 318/805 |

FOREIGN PATENT DOCUMENTS

| | | |
|---|---|---|
| 63-171181 | 7/1988 | Japan . |
| 64-16283 | 1/1989 | Japan . |

*Primary Examiner*—John W. Cabeca
*Attorney, Agent, or Firm*—Evenson, McKeown, Edwards & Lenahan

[57] ABSTRACT

The invention provides a control apparatus for an induction motor to maintain torque following controllability even with use of inexpensive speed detection units having detection delay. In a control unit, a phase correction arithmetic circuit uses a motor speed detection value detected by a speed sensor and a low-pass filter and a detection delay time of a control system to compute a correction phase. An adder adds the correction phase to a magnetic flux phase obtained by a vector control computation. The addition corrects a magnetic flux phase deviation due to detection delay of the correction phase of a primary current command, and compensates for the detection delay so as to maintain the torque following controllability of an inductor motor.

8 Claims, 9 Drawing Sheets

NO DETECTION DELAY

FIG. 3(a)

WITH DETECTION DELAY AND
WITHOUT PHASE COMPENSATION

FIG. 3(b)

WITH DETECTION DELAY AND
WITH PHASE COMPENSATION

WITHOUT TORQUE FIELD WEAKENING CONTROL

FIG. 10(a)

WITH TORQUE FIELD WEAKENING CONTROL

CONTROL APPARATUS FOR INDUCTION MOTOR

BACKGROUND OF THE INVENTION

The present invention relates to a control apparatus for controlling the torque of an induction motor, and particularly for an electric vehicle having field weakening control.

In general, it is known that the vector control method for computing and controlling magnetic flux phase can be used to control the torque of an induction motor in accordance with a torque command, such as disclosed, for example, in Japanese Patent Application Laid-Open Nos. 64-16283 and 63-171181.

The first prior art discloses a method of generating a current command for vector control. In particular, it controls the current flow to the induction motor in accordance with a current command, by feeding back the motor current before feeding out a magnetic flux current for producing a magnetic flux and the current command that is coordinate-converted to a torque current in proportion to the torque. The method allows the induction motor to produce the torque in accordance with the torque command.

The second prior art discloses a method of feeding out a voltage command for vector control. It controls the voltage to make current flow to the induction motor in accordance with the voltage command, by feeding back the motor current, coordinate-converting it to magnetic flux current and torque current, and computes current control in the same rotating coordinate system as the rotation of the magnetic flux before feeding out the voltage command. The method also compensates for mutual interference of the magnetic flux current and the torque current, the delay inherent in the current detector.

Both of these prior arts maintain linearity of the torque control of the induction motor, and cause the induction motor to produce a torque in accordance with the torque command, thereby keeping the torque following characteristic.

Prior art devices for controlling an induction motor use a field control that can decrease the magnetic flux with motor speed. Such field control prevents the voltage from becoming low if a back electromotive force of the induction motor becomes high as the motor speed increases. On the other hand, it is also known to decrease the magnetic flux when the induction motor generates low torque, which is hereinafter referred to as "torque field weakening control". Torque field weakening control has a merit that can increase the efficiency at low torque. It therefore is effective for the electric vehicle having the induction motor, in which the efficiency is highest priority.

However, it has been determined that phase deviation in the case of torque field weakening control adversely affects the output torque of the induction motor to a greater extent than ordinary field control. Thus, with torque field weakening control, delays inherent in the speed sensor cannot be ignored, while with the ordinary field control they can.

It is important that the first and second prior arts described above be able to detect motor speed correctly, since both compute a reference magnetic flux phase in terms of the detected motor speed. If they use cheap speed sensors, however, delays sometimes occur in the detection of motor speed.

For example, one type of speed generator is affected by the insertion of an analog low-pass filter to eliminate radio frequency noises, which causes a delay in the detected motor speed. Such detection delay tends to occur at a transient time when the motor speed changes. Similarly, a type of encoder having few pulses has a digital detection delay at the transient time, since a pulse period and pulse width are coarse. Such delays in the sensors cause the reference magnetic flux phase to deviate from the actual value, so that the correct magnetic flux phase cannot be obtained.

As described above, prior art control devices do not take into account the detection delay of the motor speed at the time of transients, and therefore cannot maintain linearity of the torque control. As a result, the output torque of the induction motor deviates from the torque command in transient situations.

In particular, electric vehicles which use torque field weakening control of the induction motor for high efficiency suffer from significant problems of torque following controllability. Torque field weakening control adversely affects a large inertia vibration system between a body and the motor of the electric vehicle. The body vibrates minutely in acceleration running, thereby making it uncomfortable to ride in.

SUMMARY OF THE INVENTION

In view of solving the foregoing problems of the prior art, it is a first object of the present invention to provide a control apparatus for an induction motor that can maintain accurate torque following controllability even with use of less expensive speed sensors having a detection delay.

A second object of the present invention is to provide an electric vehicle having a torque field weakening control that can decrease micro-vibrations of the vehicle body in acceleration, thereby making it comfortable to ride in.

Briefly, the foregoing objects are accomplished in accordance with the present invention by a control apparatus for an induction motor, comprising: a speed sensor for detecting speed of the induction motor; torque command output unit for outputting a torque command (in at least one embodiment, based on an input accelerator pedal position); magnetic flux phase arithmetic unit for computing a magnetic flux phase of the induction motor based on at least the motor speed and the torque command; a vector arithmetic unit for computing vector control parameters based on the magnetic flux phase; and a torque control unit for controlling the output torque of the induction motor in accordance with the torque command. A correction arithmetic unit is provided for computing a phase correction based on a speed detection characteristic of the speed sensor and on the motor speed, and the magnetic flux phase is corrected by adding the phase correction to the magnetic flux phase.

The foregoing objects are further accomplished by the torque control unit having a correction arithmetic unit for computing phase correction based on a computation characteristic of the digital arithmetic unit, and phase correction unit for correcting the magnetic flux phase by adding the phase correction to the magnetic flux phase.

The torque control unit performs vector control by means of torque and magnetic flux commands for the torque and magnetic flux to be produced by the induction motor. A magnetic flux current command value is generated to produce the magnetic flux; a torque current command value is generated in proportion to the torque; and a slip angle frequency is generated in proportion to the steady torque.

The torque control unit uses the magnetic flux current command value and the torque current command value to generate a primary current command, which includes an absolute value of the primary current and a load angle indicative of a phase difference between the primary current command and the magnetic flux current command value. It also determines a primary angular frequency of the primary current command by adding the detected motor speed and the slip angle frequency.

Integration of the primary angular frequency provides a phase of the original magnetic flux current command value, to which is added a load angle of the primary current command in a static coordinate system.

Prior art generally perform only the above-described vector control computation, while the present invention makes the following additional corrections:

A correction arithmetic unit of the torque control unit multiplies the detected motor speed by a detection delay time of the speed sensor to obtain a phase correction. A phase correction unit, in turn, adds the phase correction to the phase command value of the primary current command to obtain a phase command compensation value of the primary current command.

By means of the process described above, the primary current command value and phase command compensation value are used to determine an appropriate three-phase ac current command value. For this purpose, the phase motor current is fed back so that the motor current which flows to the respective phases of the three phase motor follows the ac current command value.

The process according to the invention can correct for the detection delay, and can achieve appropriate magnetic flux phases for vector control, even if inexpensive speed sensor having a detection delay are used. As a result, the induction motor produces an output torque in accordance with the torque command.

Moreover, even in the case where an electric vehicle having large inertia vibration characteristics uses the torque field weakening control, the present invention can achieve linear torque control by using the product of the speed sensor detection delay time and the detected motor speed to correct the magnetic flux phase. As a result, even if a speed sensor having an inherent detection delay is used, comfort can be maintained in acceleration running.

Other objects, advantages and novel features of the present invention will become apparent from the following detailed description of the invention when considered in conjunction with the accompanying drawings.

DETAILED DESCRIPTION OF THE DRAWINGS

Figure 1:
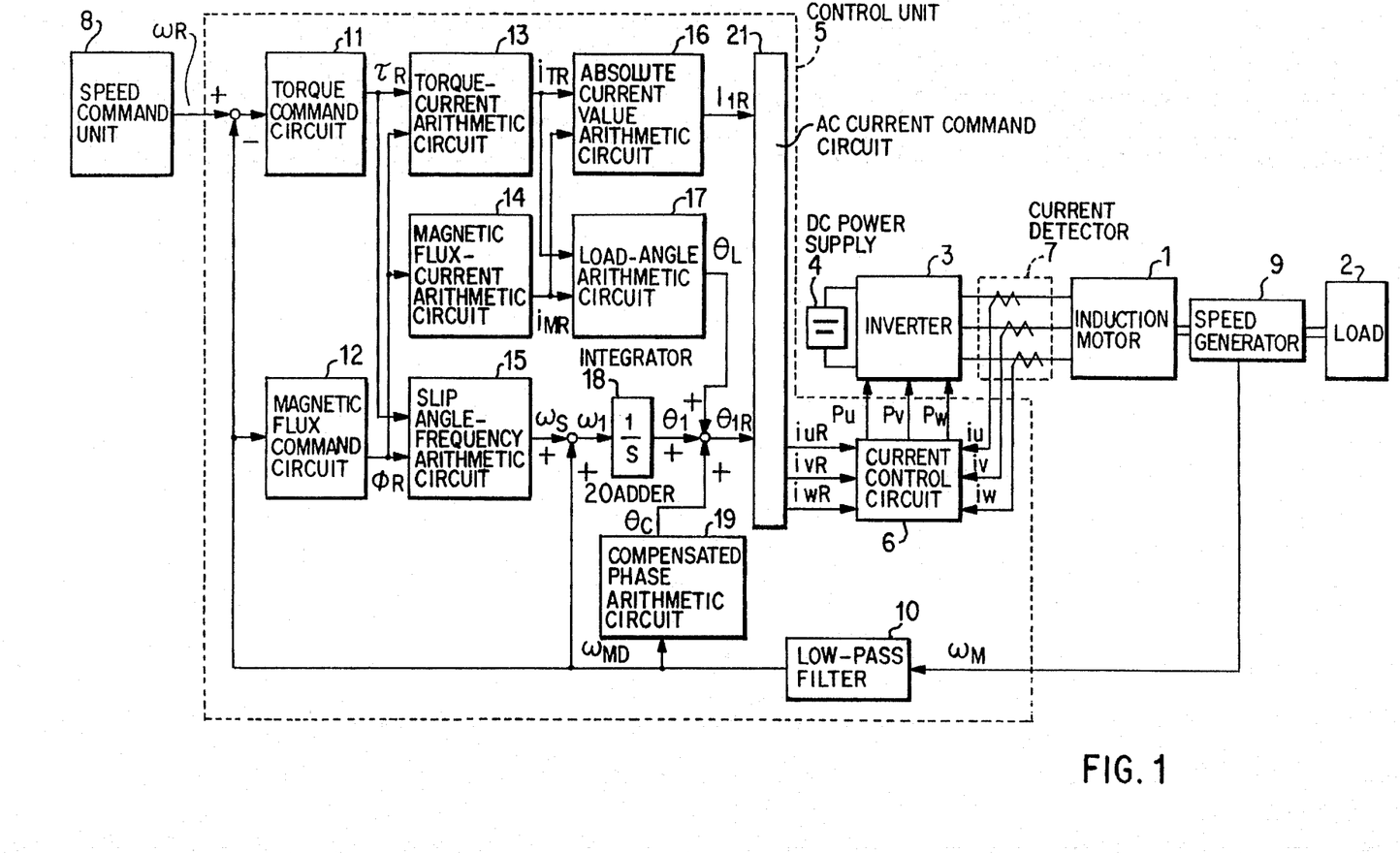
FIG. 1 is a block diagram illustrating an induction motor control apparatus of a first embodiment according to the present invention.

FIG. 1 is a block diagram illustrating an induction motor control apparatus of a first embodiment according to the present invention, which performs vector control by means of a current command.

An induction motor 1 drives a load 2 mechanically connected therewith. An inverter 3 converts energy of a dc power supply 4 to ac power to revolve the induction motor 1, as controlled by a control unit 5. A current control circuit 6 of the control unit 5 receives three phase current command values $i_{UR}$, $i_{VR}$, and $i_{WR}$ (derived in a way that will be described later), and actual current values $i_U$, $i_V$, and $i_W$ of the induction motor 1 detected by a current detector 7. The current control circuit 6 performs current feed-back controls and outputs three phase PWM pulses $P_U$, $P_V$ and $P_W$.

The PWM pulses control the inverter 3 so that the phase currents $i_U$, $i_V$, and $i_W$ follow the respective current command values $i_{UR}$, $i_{VR}$, and $i_{WR}$.

The following describes an arithmetic method of obtaining the current command values. A speed command unit 8 feeds out a motor speed command value $\omega_R$ for controlling a motor speed $\omega_M$ of the induction motor 1. A speed sensor 9 generates a voltage proportional to the motor speed, which is used to detect the motor speed $\omega_M$, and is fed into the control unit 5.

Because the motor speed signal $\omega_M$ contains substantial radio frequency noises, it is passed through a low-pass filter 10 of the control unit 5, to eliminate the radio frequency components and obtain a motor speed detection value $\omega_{MD}$ having no radio frequency components. The speed detecting arrangement for obtaining the motor speed detection value $\omega_{MD}$ therefore includes the speed sensor 9, the low-pass filter 10, and a signal transmission system, including wiring conductors.

A torque command circuit 11 receives the motor speed command value $\omega_R$ and the motor speed detection value $\omega_{MD}$ and outputs a necessary torque command value $\tau_R$, based on the difference of the two input values.

A magnetic flux command circuit 12 calculates a magnetic flux command value $\phi_R$ based on the motor speed detection value $\omega_{MD}$ of the induction motor 1. Because the voltage that can be applied to the induction motor 1 reaches a limit as the motor speed detection value $\omega_{MD}$ increases, the magnetic flux command circuit 12 computes a decrease in the magnetic flux command value $\phi_R$ when the motor speed detection value $\omega_{MD}$ exceeds a predetermined value. Although not shown in FIG. 1, the magnitude of the magnetic flux command value $\phi_R$ may also be computed based on the torque command value $\tau_R$.

In turn, a torque-current arithmetic circuit 13 calculates a torque-current command value $i_{TR}$ by dividing the torque command value by the magnetic flux command value $\phi_R$. A magnetic flux-current arithmetic circuit 14 calculates a magnetic flux-current command value $i_{MR}$ based on the magnetic flux command value $\phi_R$. A slip angle-frequency arithmetic circuit 15 calculates a slip angle-frequency $\omega_S$ based on the torque command value $\tau_R$ and the magnetic flux command value $\phi_R$.

In current vector analysis, a primary current command vector is determined by taking the vector sum of a magnetic flux-current command vector and a torque-current command vector orthogonal thereto. Therefore, the primary current command value $I_{1R}$ (that is, an absolute value of the primary current command) can be obtained by taking the square root of sum of squares of the magnetic flux-current command value $i_{MR}$ and the torque-current command value $i_{TR}$. Note that the primary current command vector is actually proportional to vector sum of the magnetic flux-current command vector and the torque-current command vector. To put it more precisely, the primary current command vector must be multiplied by a certain gain (constant). However, the embodiment is simplified.

A load angle $\theta_L$ (a phase difference between the primary current command vector and the magnetic flux-current command vector) can be obtained by $$\theta_L = \arctan(i_{TR}/i_{MR}) \quad (1)$$

Hence, an absolute current arithmetic circuit 16 and a load-angle arithmetic circuit 17 can calculate the primary current command value $I_{1R}$ and the load angle $\theta_L$, respectively, based on the values of $i_{TR}$ and $i_{MR}$.

The phase of the primary current command vector relative to a static coordinate system, or the primary current phase command value $\theta_{1R}$, can be obtained as follows. First a primary angle-frequency command value $\omega_1$ of the magnetic flux-current command vector is calculated as the sum of the motor speed detection value $\omega_{MD}$ and a slip angle-frequency $\omega_S$. An integrator 18 then integrates the sum to obtain a magnetic flux phase command value $\theta_1$ (that is, a magnetic flux phase of the magnetic flux-current command vector). Conventionally, an adder 20 adds the load angle $\theta_L$ to the magnetic flux phase command value $\theta_1$ to obtain the primary current phase command value $\theta_{1R}$.

A feature of the present invention further adds a correction phase $\theta_C$ to the load angle $\theta_L$ and the magnetic flux phase command value $\theta_1$, in the adder 20. A sum of the correction phase $\theta_C$ and the magnetic flux phase command value $\theta_1$ is called the magnetic flux phase correction command value $\theta_{\phi R}$.

The first embodiment shown in FIG. 1 uses a correction phase arithmetic circuit 19 to obtain the correction phase $\theta_C$ multiplying the motor speed detection value $\omega_{MD}$ by a detection delay time $T_D$.

If the low-pass filter 10 has a characteristic H(s) such as a primary delay characteristic expressed by, for example, Eq. 2 below, the detection delay time $T_D$ can be set to a primary delay time constant $T_f$ of the low-pass filter 10

$$H(s) = 1/(1+T_f s) = \omega_{MD}/\omega_M \quad (2)$$

where s denotes a Laplace operator. That is, $T_D = T_f$. Thus, a speed detection characteristic of the speed detecting means, including the speed sensor 9, the low-pass filter 10, and the signal transmission system (including the wiring conductors) is set on the assumption that the characteristic can be expressed by the primary delay characteristic.

A transfer function $H_\omega(s)$ from the motor speed $\omega M$ to the primary current phase command value $\theta_{1R}$ can be derived from Eq. 2 above and Eq. 3 below, as given in Eq. 4 below.

$$\theta_{1R} = \theta_1 + \theta_C = (1/s \times \omega_{MD}) = (1/s) \times \omega_M \quad (3)$$

$$H\omega(s) = 1/s = \theta_{1R}/\omega_M \quad (4)$$

Eq. 4 shows that addition of the correction phase $\theta_C$ by means of correction phase arithmetic circuit 19 can be equivalent to the characteristic having no low-pass filter 10. In other words, if the transfer function of the speed detection characteristic of the speed detecting arrangement is not 1, the correction phase $\theta_C$ can be used to compensate the transfer function to 1. Thus, the low-pass filter 10 can not only eliminate the radio-frequency noises, but also make the characteristic coincide with the one without the low-pass filter 10 as can be seen from Eq. 4.

An ac current command circuit 21 calculates the three-phase current command values $i_{UR}$, $i_{VR}$, and $i_{WR}$ by coordinate conversion of the primary current phase command value $\omega_{1R}$ and the primary current command value $I_{1R}$, compensated with the phase correction $\theta_C$. In this manner, the vector control operation is made as compensated, and can generate the three-phase current command values $i_{UR}$, $i_{VR}$, and $i_{WR}$ compensated to produce the torque according to the torque command value $\tau_R$. In other words, the actual currents $i_U$, $i_V$, and $i_W$ can be made to coincide virtually with the respective three-phase current command values $i_{UR}$, $i_{VR}$, and $i_{WR}$ operated by the current control circuit 6. This means that the torque command value $T_R$ can be made to follow the torque command value $T_R$, or the motor speed $\omega_M$ can be made to follow the motor speed command value $\omega_R$ stably.

Figure 2A:
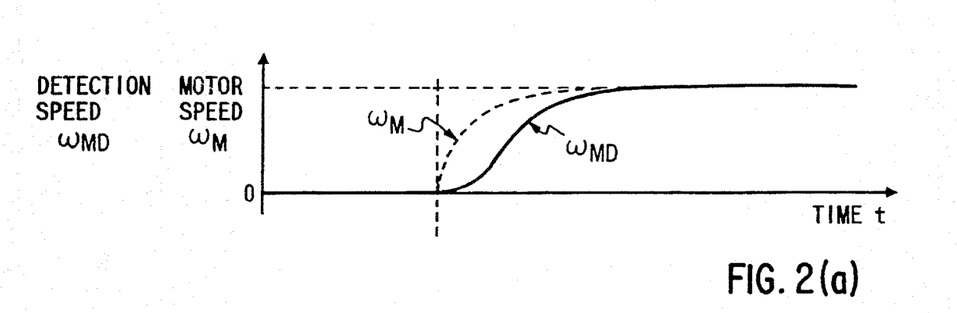
FIG. 2 shows characteristic graphs of actual motor speed and the detected motor speed detection value as well as their respective time integrals.
Figure 2B:
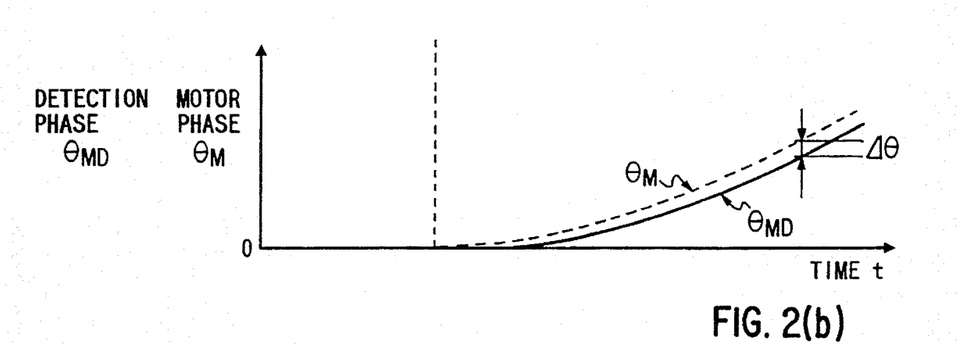
Figure 3A:
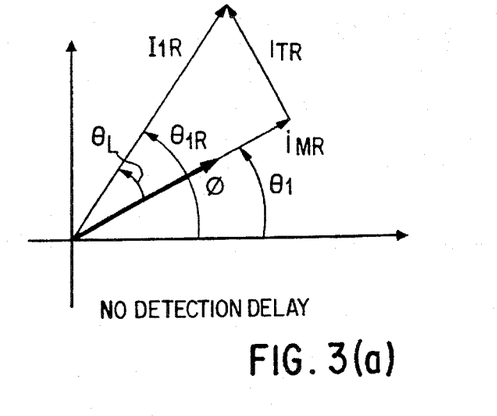
FIGS. 3(a)–3(c) are vector diagrams illustrating the current vectors with respect to the detection delay and phase correction.
Figure 3B:
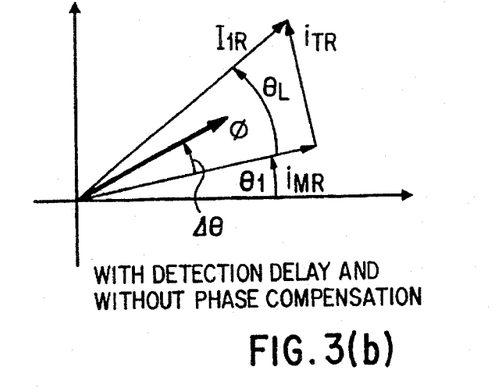
Figure 3C:
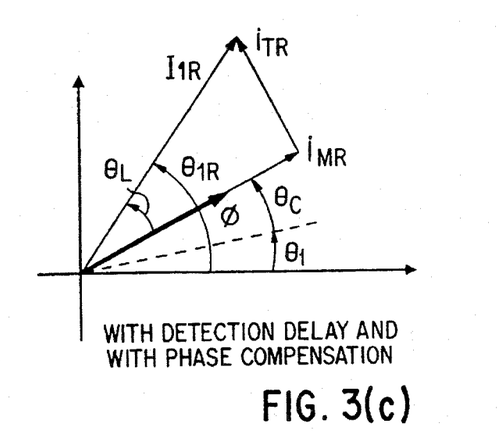

The function of the correction phase arithmetic circuit 19 that is a feature of the present invention is illustrated in FIGS. 2 and 3. FIG. 2 depicts characteristic graphs of the motor speed $\omega_M$ and the motor speed detection value $\omega_{MD}$ and detection phases which are determined as their respective integrals.

The motor speed detection value $\omega_{MD}$ is obtained from the motor speed $\omega_M$ detected by the speed sensor 9 through the low-pass filter 10. The motor speed detection value $\omega_{MD}$, as described above, is affected by the primary delay characteristic which causes it to lag behind the motor speed $\omega_M$, as shown in the figure.

Also, a detection phase $\theta_{MD}$ of the integrated motor speed detection value $\omega_{MD}$ lags behind a motor phase $\theta_M$ of the integrated motor speed $\omega_M$. Let the delay phase be denoted by $\Delta\theta$.

The slip angle-frequency $\omega_S$ is unaffected by the detection delay and bears no relationship to it. The delay phase of the magnetic flux phase command value $\theta_1$ of the integrator 18 due to effect of the low-pass filter 10 therefore is same as $\Delta\theta$.

FIGS. 3(a)–(c) are vector diagrams which illustrate the current vectors with respect to the detection delay and phase compensation. FIG. 3(a) shows the current vector without detection delay. In this case, the magnetic flux phase command value $\theta_1$ of the magnetic flux-current command value $i_{MR}$ can be made to coincide with a phase of a magnetic flux $\phi$.

FIG. 3(b) illustrates the current vector with detection delay and without phase correction. If the detection delay of the low-pass filter 10 causes a delay phase $\Delta\theta$, as shown in the figure, the magnetic flux phase command value $\theta_1$ of the magnetic flux-current command value $i_{MR}$ is delayed by the delay phase $\Delta\theta$ behind the phase of the magnetic flux $\phi$.

FIG. 3(c) depicts the current vector with detection delay, and with phase correction. In this case, the correction phase arithmetic circuit 19 computes the compensated phase $\theta_c$ corresponding to the delay phase $\Delta\theta$ before adding it to the magnetic flux phase command value $\theta_1$, so that the phase is corrected accordingly. (Compare FIGS. 3(c) and 3(a).) That is, the correction method can make the phase of the magnetic flux-current command value $i_{MR}$ coincide with that of the magnetic flux $\phi$ so that vector control can be achieved with excellent response controllability.

Accordingly, the first embodiment described above can maintain the torque following controllability, while the low-pass filter 10 is inserted to eliminate the radio frequency noises. The phase compensated arithmetic circuit 19 can compensate for the detection delay of the low-pass filter 10, to correct the feedback control, even if an inexpensive speed detecting arrangement is used, such as the speed sensor 9 producing much radio-frequency noises. The correction method can increase the torque following controllability, notwithstanding the ease of computation of the added correction phase arithmetic circuit 19.

If the speed detection characteristic of the speed detecting arrangement including the low-pass filter 10 and the associated primary delay characteristic cannot be compensated in the manner described above, its time constant can be used to set a proportional gain of the phase compensated arithmetic circuit 19 as an approximation of the primary delay characteristic. It is also possible to provide differentiation and integration capability in the arithmetic circuit 19, in addition to the proportional gain, to compensate the speed detection characteristic of the speed detecting means, including that of the low-pass filter 10.

Figure 4:
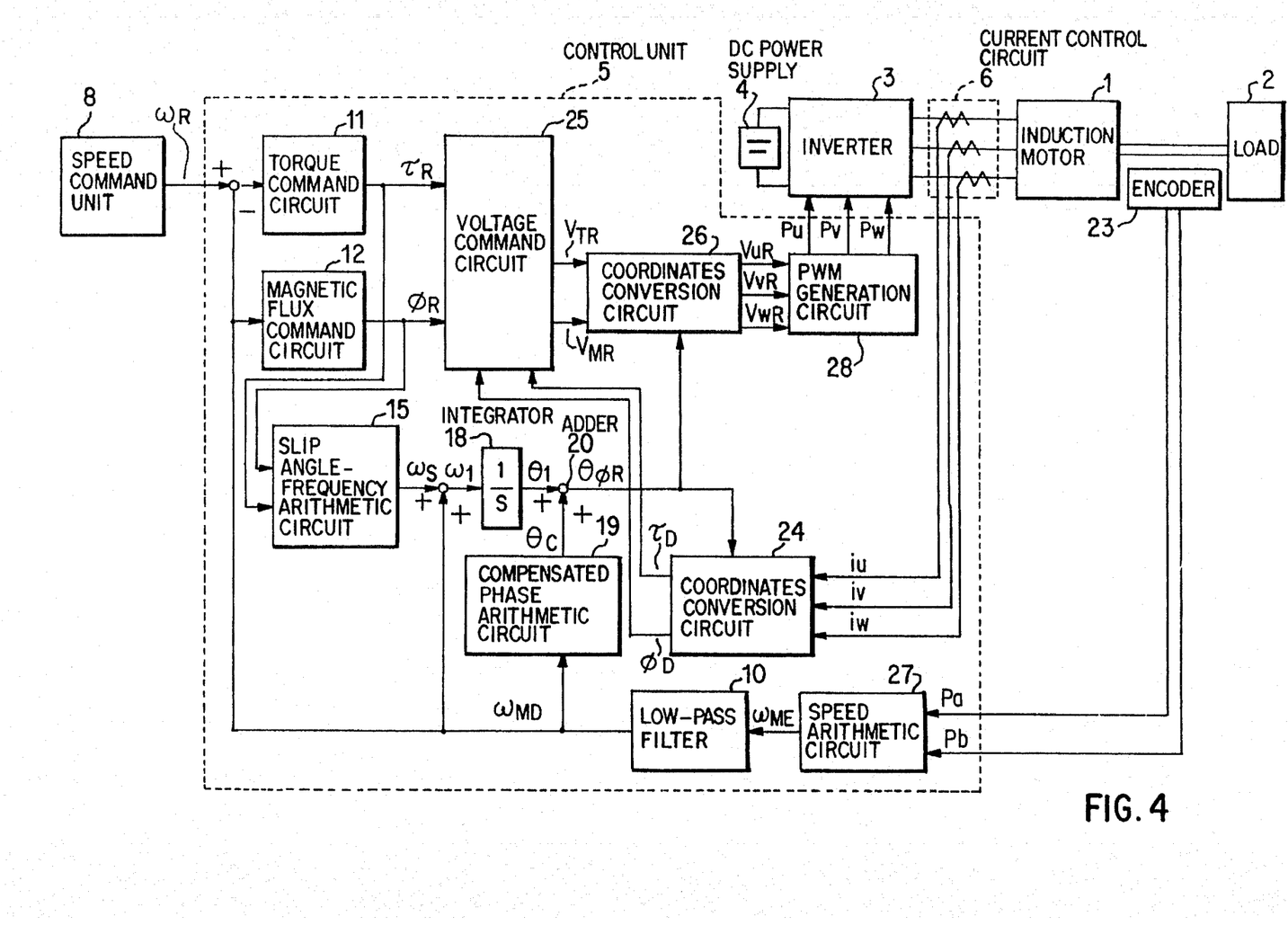
FIG. 4 is a block diagram illustrating an induction motor control apparatus of a second embodiment according to the present invention.

FIG. 4 is a block diagram which depicts an induction motor control apparatus of a second embodiment according to the present invention, which generates a voltage command for the purpose of vector control.

This second embodiment differs from the first embodiment primarily in that the speed sensor 9 is replaced by an encoder 23 and a speed arithmetic circuit 27; also, a motor torque detection value $\tau_D$ and a magnetic flux detection value $\phi_D$ (determined from the current flowing to the induction motor 1) are fed back.

First, the adder 20 adds the magnetic flux phase command value $\theta_1$ and the compensated phase $\theta_C$ to obtain the magnetic flux phase correction command value $\theta_{\phi R}$, which is used to coordinate-convert the three phase currents $i_U, i_V,$ and $i_W$ to obtain a magnetic flux current $i_M$ and a torque-current $i_T$. A coordinate conversion circuit 24 computes and detects a motor torque $T_M$ and magnetic flux $\phi$ of the induction motor 1 from the magnetic flux current $i_M$ and the torque-current $i_T$. (The computation and detection are a reverse computation of the vector control computation described above.)

The motor torque $T_M$ and magnetic flux $\phi$ computed and detected by the coordinate conversion circuit 24 are the motor torque detection value $\tau_D$ and magnetic flux detection value $\phi_D$, respectively, which are fed to a voltage command circuit 25. The voltage command circuit 25 compares the torque command value $T_R$ and magnetic flux command value $\phi_R$ generated by the torque command circuit 11 and magnetic flux command circuit 12 respectively, with the motor torque detection value $\tau_D$ and magnetic flux detection value $\phi_D$ for the purpose of feedback control. The voltage command circuit 25 then makes a control computation of the noninterfering voltage component coinciding with axis of the magnetic flux and the voltage component orthogonal thereto. (These two components interfere with each other before obtaining orthogonal voltage commands $V_{TR}$ and $V_{MR}$ of a rotating coordinate system coinciding with rotation of the magnetic flux.)

A coordinate conversion circuit 26 converts the voltage commands $V_{TR}$ and $V_{MR}$ to three phase voltage commands $v_U, v_V,$ and $v_W$ relative to a static coordinate system, which are provided to a speed arithmetic circuit 28 to generate three phase PWM pulses $P_U, P_V,$ and $P_W$ input to the inverter 3. The vector control computation described thus far above is known generally.

The following describes a phase correction method according to the invention, to compensate for detection delay in the encoder 23 and the speed arithmetic circuit 27 in FIG. 4. The encoder 23 may compute and detect periods of two phase pulses $P_a$ and $P_b$ corresponding to a revolution angle of the induction motor 1, or alternatively it computes and detects the motor speed $\omega_M$ based on the number of pulses generated for a predetermined sampling time Ts. The value computed by the speed arithmetic circuit 27 is referred to as encoder speed $\omega_{ME}$.

Figure 5:
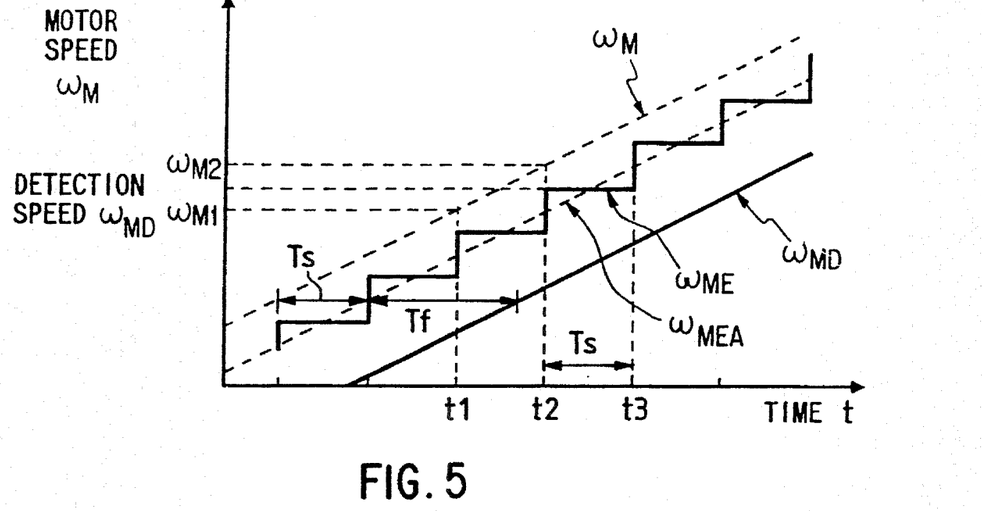
FIG. 5 is a time chart illustrating the encoder speed and the detected motor speed relative to actual motor speed.

The encoder speed $\omega_{ME}$ is smoothed by the lowpass filter 10 to obtain the motor speed detection value $\omega_{MD}$ (FIG. 5). (The low-pass filter is inserted because the pulses of the encoder 23 are sometime varied by installation accuracy of the encoder 23, and voltage of the pulse detection circuit may change even if the motor speed $\omega_M$ is constant.) Therefore, the speed detection characteristic of the speed detecting arrangement of FIG. 4 includes those of the encoder 23, the speed arithmetic circuit 27, the low-pass filter 10, and the signal transfer system, including the wiring conductors.

FIG. 5 is a time chart which shows the encoder speed $\omega_{ME}$ and the motor speed detection value $\omega_{MD}$ with respect to the motor speed $\omega_M$. The motor speed $\omega_{ME}$ detected for each sampling interval Ts by the speed arithmetic circuit 27 is an average value for the preceding sampling time Ts. For example, the encoder speed $\omega_{ME}$ detected at time t2 in the figure is an average value of the motor speed $\omega_{M1}$ at time $t_1$ and the motor speed $\omega_{M2}$ at time t2. It can be seen, therefore, that the average value $\omega_{MEA}$ of the encoder speed $\omega_{ME}$ lags behind the motor speed $\omega_M$ by the sampling time Ts. The motor speed detection value $\omega_{MD}$ also lags behind the average encoder speed value $\omega_{MEA}$, by a time constant $T_f$ of the low-pass filter 10.

Taking the above-described facts into account, the gain of the phase compensated arithmetic circuit 19 is set to (TS+ $T_f$). The second embodiment therefore can generate an appropriate phase correction $\theta_C$ even with use of an encoder of the discrete speed detection type, which is taken into account to compensate the feedback control. The embodiment thus can maintain the torque following controllability.

Figure 6:
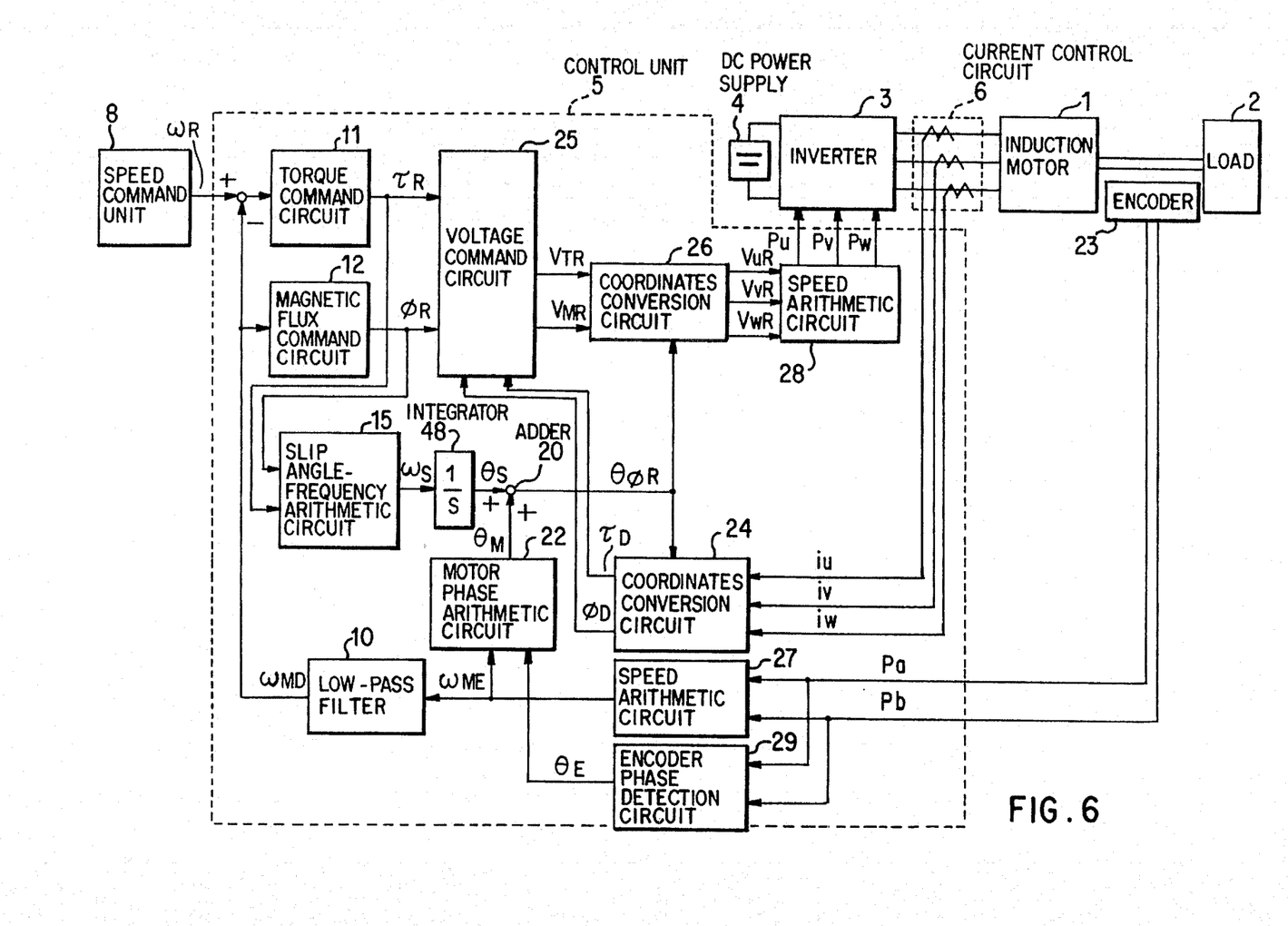
FIG. 6 is a block diagram illustrating an induction motor control apparatus of a third embodiment according to the present invention.

FIG. 6 is a block diagram of an induction motor control apparatus according to a third embodiment of the present invention, which performs vector control by way of a voltage command. It differs from the second embodiment primarily in that integration of the motor speed detection value and of the slip angle-frequency are separated from each other.

As shown in the figure, this third embodiment eliminates the addition of the motor speed detection value $\omega_{MD}$ and the slip angle-frequency $\omega_S$, and has additional motor phase arithmetic circuit 22 and PMW generation circuit 29 in place of the phase compensated arithmetic circuit 19. In this arrangement, a signal output of an integrator 48 is an integrated value of the slip angle-frequency $\omega_S$, which is thus equal to a slip phase $\theta_S$.

Also, the PMW generation circuit 29 uses the two phase pulses $P_a$ and $P_b$ of the encoder 23 indicative of a discrete revolution angle of the induction motor 1 to detect an encoder phase $\theta_E$. The encoder phase $\theta_E$ can be obtained easily by determining a revolution direction is from the phase relationship between the two phase pulses $P_a$ and $P_b$, and depending on it, the input pulses increment or decrement a counter.

The concept of the third embodiment is described below before the motor phase arithmetic circuit 22 is explained. The revolution angle of the motor itself, can be determined by integration of the motor speed $\omega_M$. The encoder phase $\theta_E$ therefore can be used to obtain the motor speed, which is advantageous in that the detection delay may not be taken into account since the revolution angle is used directly. However, the encoder phase $\theta_E$ is also disadvantageous in that vector control cannot be used unless an expensive high resolution encoder having a very large number of pulses per turn is employed.

The third embodiment of the invention can make the best use of the encoder phase $\theta_E$ even if an inexpensive lower resolution encoder is used having a small number of pulses per turn.

Figure 7:
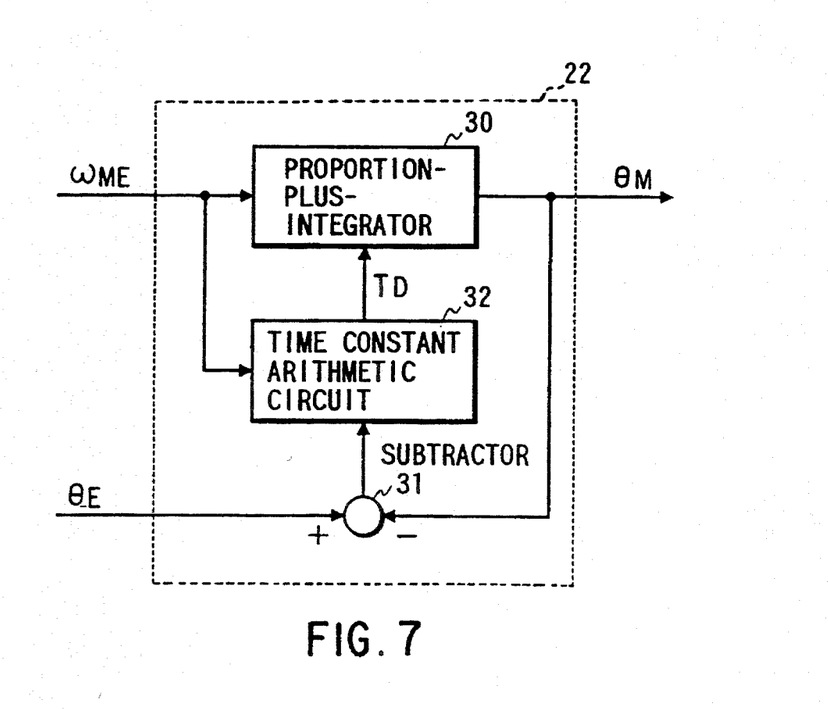
FIG. 7 is a block diagram illustrating a construction for the motor phase arithmetic circuit 22 of the third embodiment described with FIG. 6.

FIG. 7 is a block diagram illustrating a construction for the motor phase arithmetic circuit 22 of the third embodiment described with FIG. 6, which has the encoder speed $\omega_{ME}$ and the encoder phase $\theta_E$ input thereto. This embodiment uses the encoder speed $\omega_{ME}$, rather than the motor speed detection value $\omega_{MD}$, as the motor speed signal fed to the motor phase arithmetic circuit 22. The motor speed detection value $\omega_{MD}$ having passed the low-pass filter 10 is used for the motor speed signal for speed control computation.

The motor phase $\theta_M$ is obtained from the encoder speed $\omega_{ME}$ by a proportion-plus-integrator 30 of the motor phase arithmetic circuit 22, using Eq. 5 below.

$$\theta_M(s) = (T_D + 1/s)\omega_{ME}(s) \quad (5)$$

Note that the third embodiment uses the sampling time Ts of the speed arithmetic circuit 27 for counting the pulses of the encoder 23 as the detection delay time $T_D$ that is the proportional gain. The sampling time Ts is determined by the time constant arithmetic circuit 32 that will be described later.

It can be seen that the computation of Eq. 5 for the encoder speed $\omega_{ME}$ by the proportion-plus-integrator 30 is equivalent to that of Eq. 4 for the motor speed detection value $\omega_{MD}$ by the integrator 18 and the correction phase arithmetic circuit 19. Therefore, the magnetic flux phase correction command value $s\phi_R$ output by the adder 20 (the sum of the motor phase $\theta_M$ and the slip phase $\theta_S$) is same as the one in the second embodiment described in FIG. 4, which means that the computation can correct the detection delay of the motor speed to compensate the feedback control. This feature can keep the torque following controllability.

Referring again to FIG. 7, a subtracter 31 takes the difference of the motor phase $\theta_M$ from the slip phase $\theta_E$, which is fed to a time constant arithmetic circuit 32. If the difference falls within a predetermined range, the computation of the proportion-plus-integrator 30 of the motor phase $\theta_M$ is not problematic. However, if the motor phase $\theta_M$ is less than the encoder phase $\theta_E$ for an acceleration transient period (that is, in which the induction motor 1 accelerates), this means that the detection delay time $T_D$ given in Eq. 5 is shorter than an actual sampling time Ts, and is not adaptive. The detection delay time $T_D$ must therefore be corrected to a longer value. On the contrary, if the motor phase $\theta_M$ is less than the encoder phase $\theta_E$, the detection delay time $T_D$ is longer than the actual sampling time Ts, and must be shortened.

For a deceleration transient period, the correction (increase or decrease) of the detection delay time $T_D$ must be the reverse of that noted above. As before, the time constant arithmetic circuit 32 receives the deviation of the encoder phase $\theta_E$ from the motor phase $\theta_M$, and judges the acceleration or deceleration from change of the encoder speed $\omega_{ME}$ before correcting the detection delay time $T_D$. That is, if the speed detection characteristic of the speed detecting means is changed, the time constant arithmetic circuit 32 detects the change before correcting the speed detection characteristic itself with use of the change whenever it occurs.

The construction described above can always identify the detection delay time TD with actual sampling time if the detection delay time is not known, or if analog circuits undergo secular change. The embodiment also has the advantage that the torque following controllability can be maintained at a satisfactory level for a long term.

As described above, this embodiment uses the time constant arithmetic circuit 32 to identify the detection delay time for the purpose of compensation. However, it is also possible to use the difference of the encoder phase $\theta_E$ from the motor phase $\theta_M$ to correct the motor phase $\theta_M$ directly.

Figure 8:
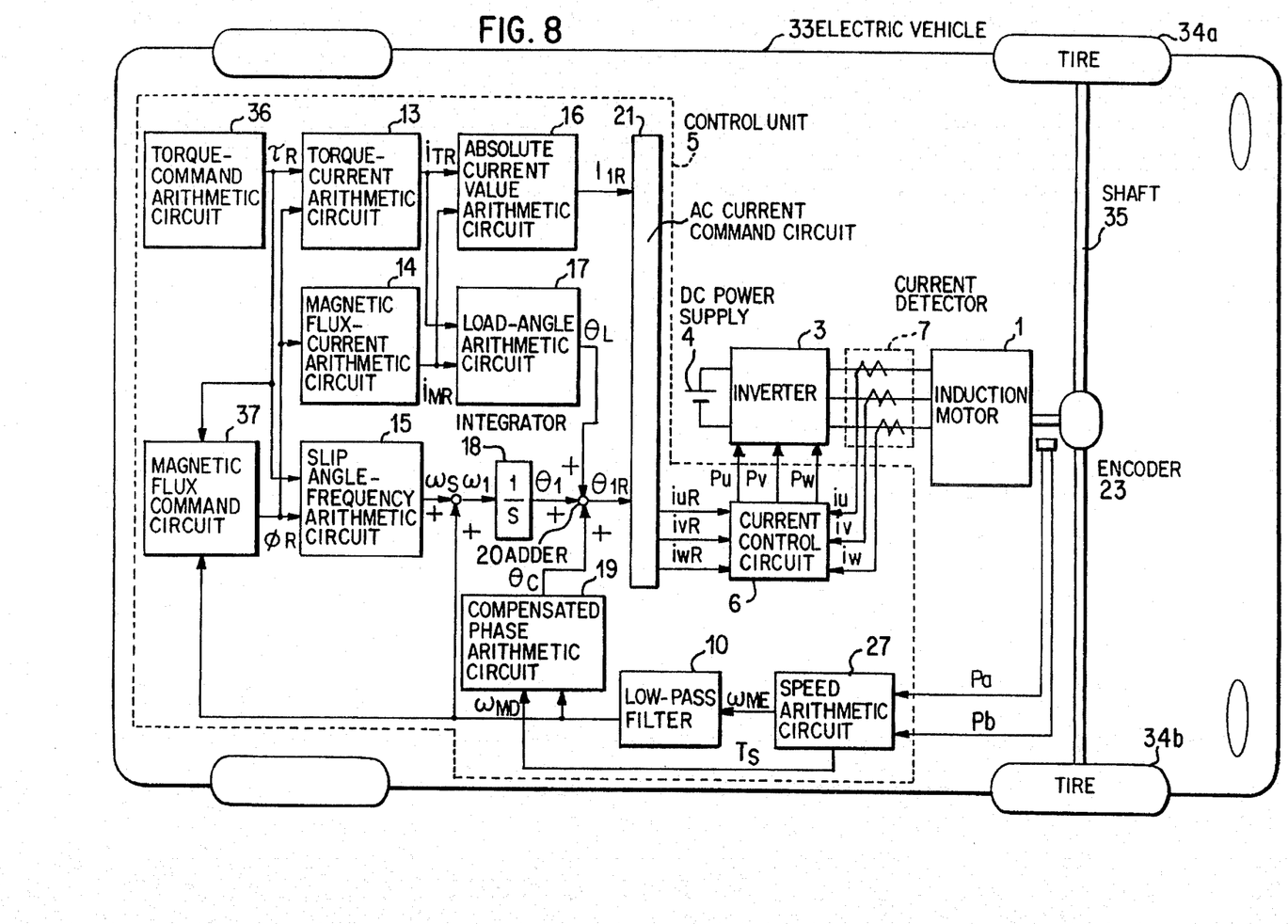
FIG. 8 is a block diagram illustrating an electric vehicle of a fourth embodiment according to the present invention.

FIG. 8 is a block diagram which shows an electric vehicle of a fourth embodiment according to the present invention, which is based on the vector control method described in the first embodiment with FIG. 1. The difference of the fourth embodiment from that of the second embodiment is described below.

The induction motor 1 drives tires 34a and 34b via a shaft 35 to run the electric vehicle 33. The detection circuit for motor speed is constructed virtually the same as in FIG. 4, the motor speed $\omega_M$ of the induction motor 1 being detected by the encoder 23. This embodiment differs from the one in FIG. 4 in that the speed computation circuit 27 itself outputs the sampling time Ts of the speed arithmetic circuit 27.

The electric vehicle motor, unlike ordinary motor controls, often needs a large torque even in a static or very slow running state. It is therefore important to be able to detect the motor speed $\omega_M$ accurately at a low speed. It happens, however, that the encoder 23 does not generate a pulse during the sampling time Ts at the very low running speed because it does not generate the pulse unless the induction motor 1 turns by a predetermined angle. For this reason, the sampling time Ts for detection of the motor speed $\omega_M$ is increased if the motor speed $\omega_M$ is very slow. Such a change of the sampling time Ts also changes the detection delay time $T_D$. Taking this into account, in the embodiment shown in FIG. 8 the changed sampling time Ts is output by the speed arithmetic circuit 27 and entered into the correction phase arithmetic circuit 19 for the purpose of compensation. Also, if the speed detection characteristic of the speed detecting means is changed, the change is detected and used to compensate the speed detection characteristic itself, whenever the change occurs.

Figure 9:
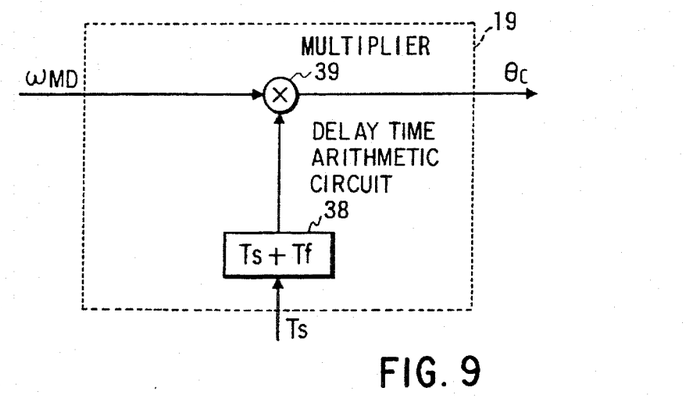
FIG. 9 is a block diagram illustrating a construction for a compensation phase computation circuit of the fourth embodiment in FIG. 8.

FIG. 9 is a block diagram of a compensation phase arithmetic circuit 19 of the fourth embodiment in FIG. 8, comprising a delay time arithmetic circuit 38 which makes computation correction by adding a primary delay time constant $T_f$ of the low-pass filter 10 to the sampling time Ts to obtain an adequate detection delay time. The phase compensated arithmetic circuit 19 also comprises a multiplier 39 that computes the product of the motor speed detection value and the detection delay time TD, and outputs a compensated phase $\theta_C$, which takes the compensation of the sampling time Ts into account.

On the other hand, this embodiment performs torque field weakening control at times of low torque, in order to increase efficiency of the electric vehicle. A torque command arithmetic circuit 36 computes the torque command value $\tau_R$ to be generated by the induction motor 1 based on an acceleration or brake signal (not shown in FIG. 8). The torque command value $\tau_R$ is fed into the torque-current arithmetic circuit 13 and the slip angle frequency arithmetic circuit 15 as in the first embodiment, but also is fed into a magnetic flux command circuit 37.

The magnetic flux command circuit 37 performs the ordinary computation of field control, which decreases the magnetic flux command value $\phi_R$ with increasing motor speed detection value $\omega_{MD}$. The magnetic flux command circuit 37 also computes the torque field weakening control that decreases the magnetic flux command value $\phi_R$ if the torque-current command value $\tau_R$ is small. Torque field weakening control decreases the current flowing in the induction motor 1, thereby decreasing current loss, and increasing the efficiency of power usage.

However, if the torque field weakening control decreases the magnetic flux command value $\phi_R$ to a great extent, the motor speed detection delay is affected.

Figure 10A:
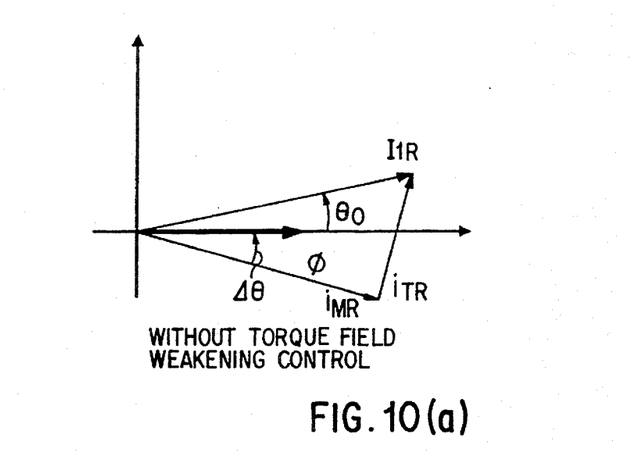
FIGS. 10(a) and (b) are vector diagrams illustrating the influence of the torque field weakening control to the delay phase.
Figure 10B:
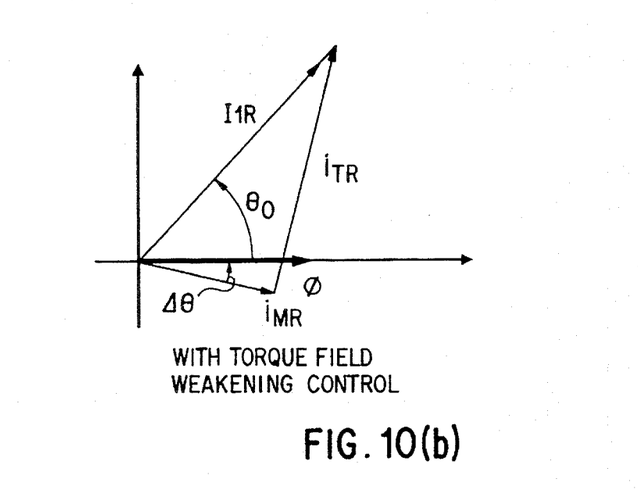

FIG. 10 contains vector diagrams illustrating the influence of the torque field weakening control to the delay phase. The following describes the effect if the detection delay is not phase corrected at the time of torque field weakening control. The motor torque $\tau_M$ produced by the induction motor 1 is given by the product of the magnetic flux current $i_M$ and the torque-current $i_T$. The torque command value $\tau_R$ is given by product of the magnetic flux-current command value $i_{MR}$ and the torque-current command value $i_{TR}$.

If no torque field weakening control is provided as in FIG. 10(a), a delay phase $\Delta\theta$ makes $\tau_M < \tau_R$. That is, the motor torque $\tau_M$ tends to become smaller than the torque command value $\tau_R$, which slows down the induction motor 1. As a result, it decreases the delay phase $\Delta\theta$, causing no influence.

On the contrary, if the torque field weakening control is provided as in FIG. 10(b), the delay phase $\Delta\theta$ makes $\tau_M \geq \tau_R$. Because motor torque $\tau_M$ tends to become larger than the torque command value $\tau_R$, the induction motor 1 accelerates, increasing the delay phase $\Delta\theta$. The increase of the phase adversely affects, for example, a vibration system of the electric vehicle.

The electric vehicle which makes extensive use of torque field weakening control can correct for the motor speed detection delay to compensate the feedback control, thereby decreasing micro-vibrations caused in acceleration, and making the vehicle comfortable to ride in.

Figure 11:
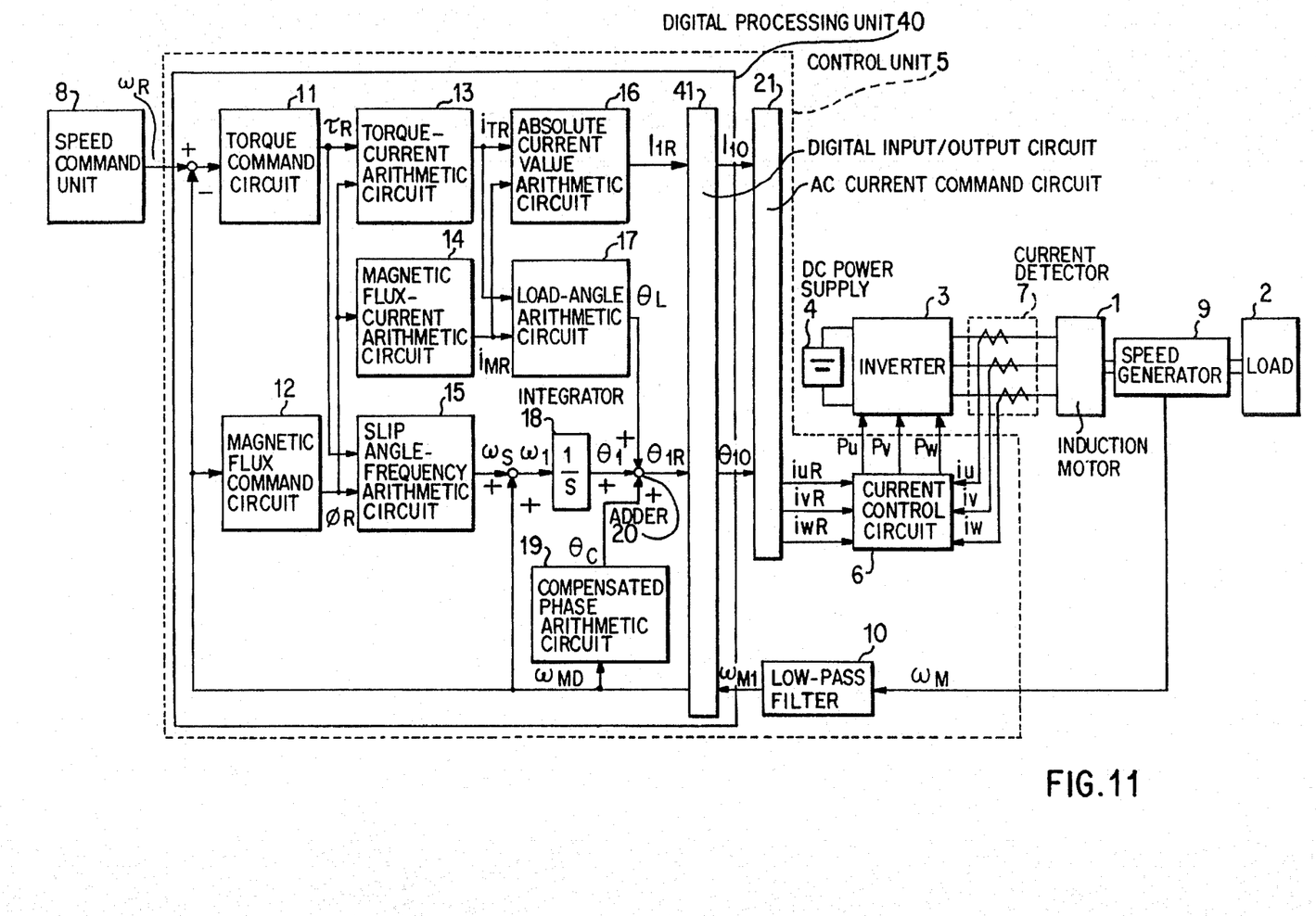
FIG. 11 is a block diagram illustrating an induction motor control apparatus of a fifth embodiment according to the present invention.

FIG. 11 is a block diagram of an induction motor control apparatus of a fifth embodiment according to the present invention. The control unit has a digital processing unit 40 as a computation circuit for torque control, being different from the one in FIG. 1. The digital processing unit 40 uses the motor speed detection value $\omega_{MD}$ output by a digital input/output circuit 41 to perform speed control and vector control computations in ways similar to the ones in the first embodiment in FIG. 1, thereby performing torque control. The digital input/output circuit 41 uses the obtained primary current command value $I_{1R}$ and primary current phase command value $\theta_{1R}$ to feed a primary current output value $I_{1O}$ and a primary current phase output value $I_{1O}$ to the ac current command circuit 21.

The digital processing unit 40 takes a certain digital computation time $T_D$ for computation from input to output, which causes a delay in the phase of the current command. Moreover, the motor speed detection value $\omega_{MI}$ is affected by the detection delay of the low-pass filter 10. For this reason, the sum of the digital computation time $T_C$ and primary delay time constant $T_f$ of the low-pass filter 10 is used to set the gain of the correction phase arithmetic circuit 19, which can make the correction, taking into account not only the influence of the speed detection characteristic of the speed detecting arrangement, but also the computation characteristic of the digital processing unit 40.

As described above, the output torque following controllability of the induction motor is affected by the computation characteristic of the digital processing unit 40. If there is no speed detection characteristic of the speed detecting means, the phase of the current vector can be corrected using only the computation characteristic of the digital processing unit 40. Thus, the present invention can be used effectively even for a control unit having a microcomputer to make digital calculations.

The embodiments described above for the control apparatus for induction motor according to the present invention, are illustrated in the embodiment of an electric vehicle. However, the invention can also be used for machine tools, robots, rolling machines, and other systems which use torque field weakening control. Moreover, as an alternative to the low-pass filter limited to the primary delay speed detection characteristic, a different correction for another characteristic can provide the same effect. It is also apparent that the present invention can be used for a different control algorithm for the vector control.

As described so far, the present invention provides control apparatus for an induction motor having an excellent torque controllability since it can correct detection delay of inexpensive speed sensor to compensate the torque control linearity. In particular, the present invention can decrease the micro-vibrations caused during acceleration of the electric vehicle having torque field weakening control, thereby making it comfortable to ride in.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control apparatus for an induction motor, comprising:

a speed detection arrangement for detecting speed of the induction motor, said speed detection arrangement having a speed detection characteristic associated therewith;

a torque command circuit which generates a torque command;

a magnetic flux phase arithmetic unit which computes a magnetic flux phase of the induction motor based on at least the speed of the motor detected by said speed detection arrangement, and the torque command;

a vector arithmetic unit for computing vector control parameters based on the magnetic flux phase; and a torque control unit for controlling the output torque of the induction motor in accordance with the torque command; wherein said torque control unit has a compensation arithmetic unit for computing a phase compensation value which corrects said magnetic flux phase computed by said magnetic flux phase arithmetic unit to compensate for the speed detection characteristic of said speed detection arrangement, said phase compensation value being based on the speed detection characteristic of the speed detection arrangement, and the motor speed; and a phase correction unit for correcting the magnetic flux phase by adding the phase compensation value to the magnetic flux phase computed by said magnetic flux phase arithmetic unit.

2. Control apparatus according to claim 1 wherein the compensation arithmetic unit computes the phase compensation value based on the product of a detection delay time of the speed detection means and the motor speed.

3. Control apparatus according to claim 1, further comprising:

a speed characteristic change detection unit for detecting change of the speed detection characteristic; and characteristic correction unit for correcting the speed detection characteristic in response to the detected change.

4. Control apparatus for an induction motor, comprising:

a motor speed detection unit for detecting speed of the induction motor, said speed detection arrangement having a speed detection characteristic associated therewith;

a torque command circuit which generates a torque command;

a magnetic flux phase arithmetic unit which computes a magnetic flux phase of the induction motor based on at least the speed of the motor detected by said speed detection arrangement, and the torque command;

a digital arithmetic unit for digitally computing vector control parameters based on the magnetic flux phase; and a torque control unit for controlling the output torque of the induction motor in accordance with the torque command; wherein said torque control unit has a compensation arithmetic unit for computing a phase compensation value which corrects said magnetic flux phase computed by said magnetic flux phase arithmetic unit to compensate for the speed detection characteristic of said speed detection arrangement, said phase compensation value being based on the computation characteristic of the digital arithmetic unit; and a phase correction unit for correcting the magnetic flux phase by adding the phase compensation value to the magnetic flux phase computed by said magnetic flux phase arithmetic unit.

5. Control apparatus according to claim 4 wherein the compensation arithmetic unit computes the phase compensation value based on the product of computation time of the digital arithmetic unit and the motor speed.

6. An electric vehicle, comprising:

an induction motor for producing a torque for driving the electric vehicle;

a speed detection unit for detecting speed of the induction motor, said speed detection unit having a speed detection characteristic associated therewith;

a torque command arithmetic unit for computing a torque command based on a position of an accelerator of the electric vehicle;

a magnetic flux phase arithmetic unit which computes a magnetic flux phase of the induction motor based on at least the speed of the motor detected by said speed detection unit, and the torque command;

a vector arithmetic unit for computing vector control parameters based on the magnetic flux phase; and a torque control unit for controlling the torque produced by the induction motor in accordance with the torque command; wherein said torque control unit has a compensation arithmetic unit for computing a phase compensation value which corrects said magnetic flux phase computed by said magnetic flux phase arithmetic unit to compensate for the speed detection characteristic of said speed detection unit, said phase compensation value being based on a speed detection characteristic of the speed detecting unit, and the motor speed; and a phase correction unit for correcting the magnetic flux phase by adding the phase correction value to the magnetic flux phase computed by said magnetic flux phase arithmetic unit.

7. Method for controlling an induction motor, comprising the steps of:

detecting speed of said induction motor by means of a speed detection unit having a speed detection characteristic associated therewith;

providing a torque command input from torque command input unit;

computing magnetic flux phase of the induction motor based on the speed of the motor detected by said speed detection unit, and the torque command;

computing vector control parameters based on the magnetic flux phase; and controlling the output torque of the induction motor in response to the torque command, said method comprising the further steps of computing a phase compensation value which corrects said magnetic flux phase computed by said magnetic flux phase arithmetic unit, to compensate for the speed detection characteristic of speed detection unit, said phase compensation value being based on the speed detection characteristic of the speed detection unit, and the motor speed; and correcting the magnetic flux phase by adding the phase compensation value to the magnetic flux phase computed in said step of computing magnetic flux phase.

8. In an induction motor control apparatus of the type providing vector control of said induction motor based on an input speed command, motor speed detected by a motor speed detection unit, which motor speed detection unit has a delay characteristic associated therewith, and a calculated value of a magnetic flux phase of said motor, a phase correction arrangement comprising:

a compensation arithmetic unit for computing a phase compensation value which corrects said magnetic flux phase computed by said magnetic flux phase arithmetic unit to compensate for the speed detection characteristic of speed detection unit, said phase compensation value being based on the detection characteristic of the speed detection unit and on said motor speed; and a phase correction circuit for correcting the magnetic flux phase of said motor by adding the phase compensation value to said magnetic flux phase of said motor.

* * * * *